R. B. CREASY.
FOLDING COT.
APPLICATION FILED FEB. 2, 1922.

1,434,100.

Patented Oct. 31, 1922.
3 SHEETS—SHEET 1.

Inventor
R. B. Creasy.
By
Lacey & Lacey, Attorneys

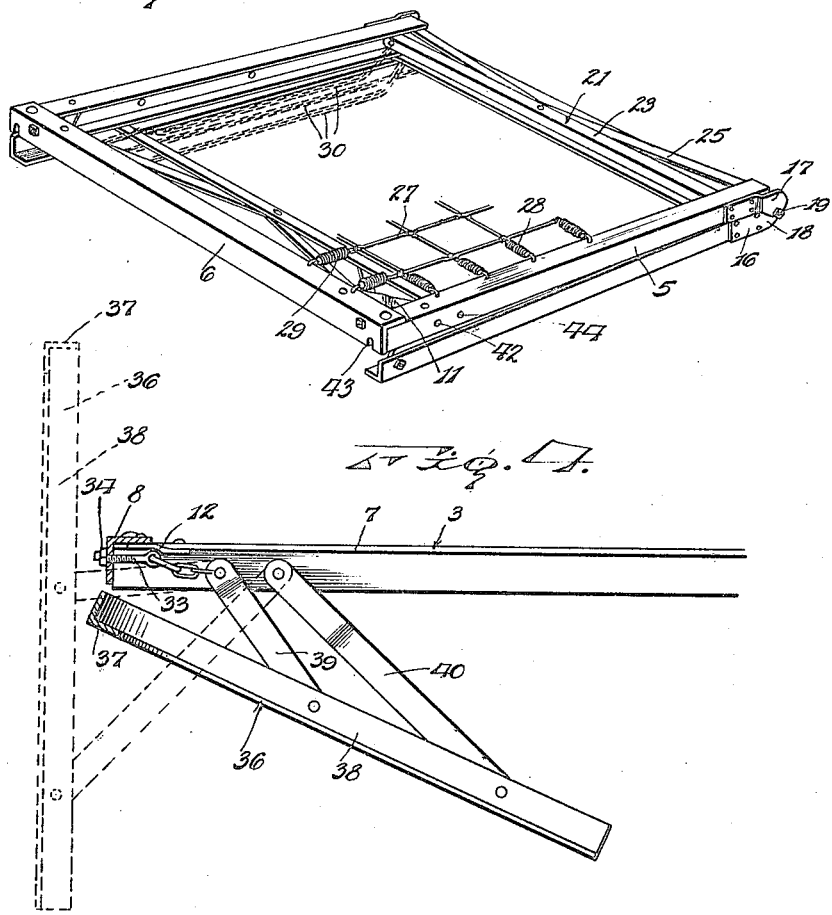

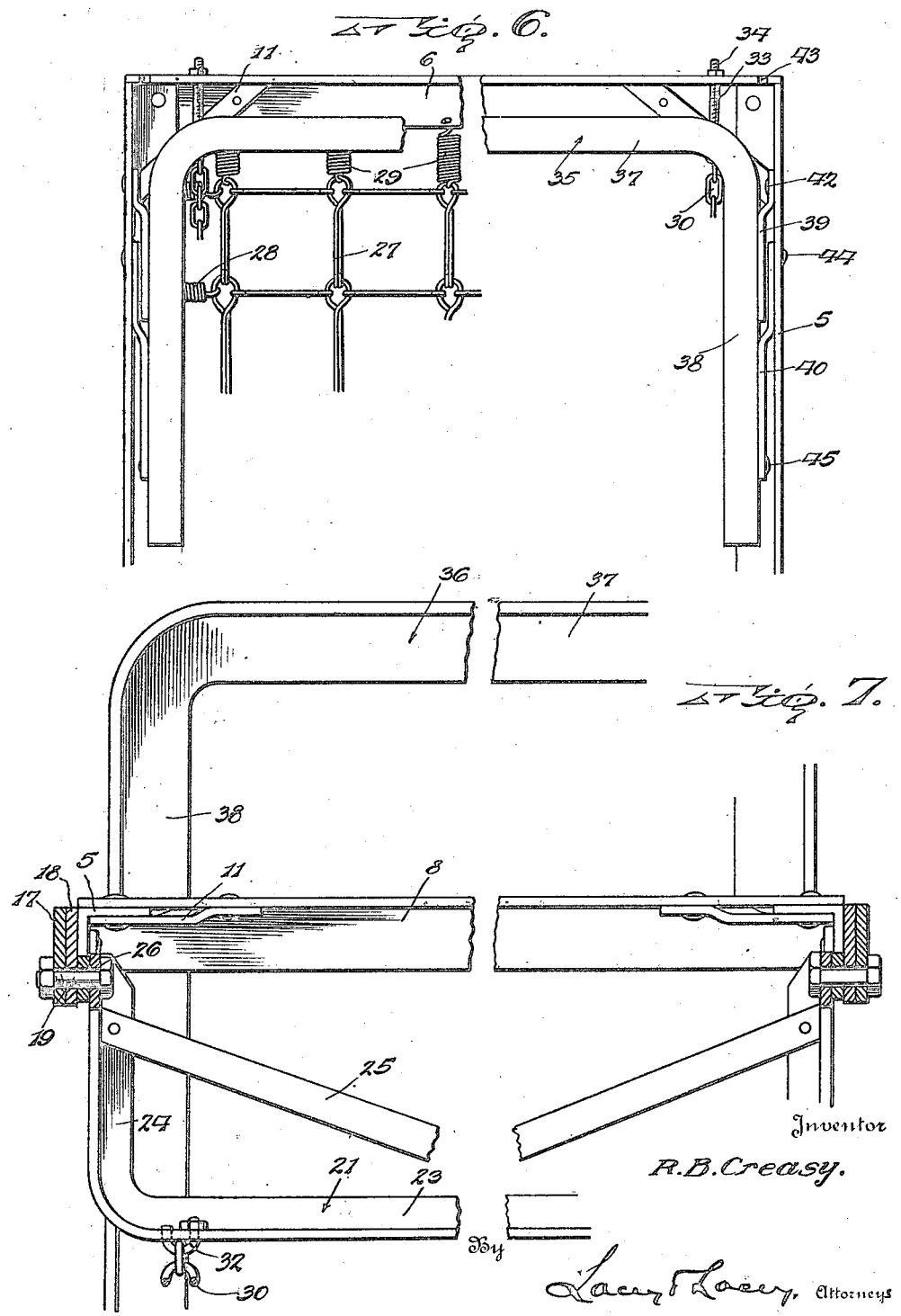

Patented Oct. 31, 1922.

1,434,100

UNITED STATES PATENT OFFICE.

REUBEN B. CREASY, OF BALLINGER, TEXAS.

FOLDING COT.

Application filed February 2, 1922. Serial No. 533,710.

*To all whom it may concern:*

Be it known that I, REUBEN B. CREASY, a citizen of the United States, residing at Ballinger, in the county of Runnels and State of Texas, have invented certain new and useful Improvements in Folding Cots, of which the following is a specification.

This invention relates to improvements in folding cots and has as its general object to provide a cot which may be folded into compact flat form so as to occupy minimum space thus adapting it to be conveniently carried in an automobile on touring trips as well as to provide for its more convenient shipment and storage when not in use.

Another object of the invention is to provide a folding cot which will be exceptionally substantial when set up for use and wholly free from liability of collapse through weight imposed thereon. In this connection the invention contemplates the provision of truss means for relatively bracing the side rails of the cot frame to prevent their distortion, and for bracing and supporting the intermediate portion of the frame and better adapt it to sustain weight.

Another object of the invention is to provide a cot comprising relatively foldable sections adapted to be nested and folded in such a manner as to reduce the structure to the smallest possible marginal dimensions.

A further object of the invention is to provide a novel means for mounting and connecting the head and foot frames of the cot with the bed frame thereof to provide for folding of the said head and foot frames to position wholly within the bounds of the sections of the bed frame with which they are associated.

A further object of the invention is to provide a connection between the head and foot frames and the respective sections of the bed frame of such nature as to cause the said head and foot frames to automatically assume a folded position within the bounds of the respective bed frame sections when they are moved about said connections so that no annoyance or difficulty will be experienced in properly positioning these parts of the structure.

In the accompanying drawings:

Figure 1 is a perspective view of a cot embodying the invention;

Figure 2 is a perspective view of the cot partly folded;

Figure 3 is a perspective view of the cot completely folded;

Figure 4 is a detail vertical longitudinal sectional view through one end of the cot, for example the foot end and illustrating the foot frame in dotted lines in set up position and in full lines in partly folded position;

Figure 5 is a view similar to Figure 4 but taken through the entire structure completely folded;

Figure 6 is a bottom plan view of one end, for example the foot end, of the cot, the foot frame being in folded position; and Figure 7 is a detail vertical transverse sectional view taken in a plane with the hinge connection between the head and intermediate sections of the bed frame.

The bed frame of the cot is indicated in general by the numeral 1 and the same comprises a head section 2, a foot section 3, and an intermediate section 4. These three sections are preferably made of angle iron, and the head section 2 comprises sides 5 and a connecting end 6. In like manner the foot section 3 comprises sides 7 and a connecting member 8. The ends of the sides 5 of the section 2 are permanently connected with the ends of the connecting member 6 by bolts or other suitable fastening elements 9, and the ends of the sides and connecting members 7 and 8 are likewise united by similar elements 10. Also the sections are braced at their corners by diagonal braces 11 and 12. The intermediate section 4 comprises spaced sides 13 which are connected and relatively braced in a manner which will presently be explained.

The head section 2 and intermediate section 4 are connected at the adjacent ends of their sides 5 and 13 by means of hinges indicated in general by the numeral 14 and each of these hinges comprises a pair of members one indicated by the numeral 15 and the other by the numeral 16, these members being riveted or otherwise permanently secured respectively to the depending wings of the angle iron sides of the sections 2 and 4. The member 15 is provided with a hinge ear 17 which is laterally offset with relation to the plane of the wing of the side 5 to which the member 15 is secured, and the respective member 16 is provided with a similar ear 18 received between the ear 17 and the respective side 5, a pivot bolt 19 being fitted through said ears 17 and 18 to pivotally connect the same and provide for relative folding of the sections 2 and 4. By reference to Figures 1, 5 and 7 of the drawings it will be observed that the ears 17 and 18 of the hinge members are so formed as to project beyond the free edges of the vertical wings of the sides 5 and 13 to which the hinge members are respectively secured so that the pivot bolt 19 will be so located that when the sections are relatively folded the said edges of the said wings will be brought into mutual contact at the opposite sides of the structure. Likewise, when the sections are extended in the set-up condition of the cot, the adjacent ends of the sides 5 and 13 of the sections will mutually abut as clearly shown in Figure 1 of the drawings thus adding to the stability of the bed frame. The meeting ends of the foot section 3 and intermediate sections 4 are pivotally connected by pivot bolts 20 which are engaged through the depending wings of their sides 7 and 13 respectively, and in thus connecting these sections of the bed frame, the ends of the sides 7 of the section 3 are disposed within the angles of the ends of the sides 13 so that when the sections are relatively folded, the section 3 will be nested within the section 4 or in other words the sides 7 will be received snugly within the angles of the sides 13.

The sides of the bed frame as a whole are relatively braced and supported by means of a truss structure embodying transverse trusses 21 and 22. Each of these trusses comprises a cross bar 23 and right angularly extending ends 24, and the trusses are preferably of angle iron and have their portions 23 and 24 relatively braced by diagonal brace members 25. The truss 21 is supported transversely beneath the bed frame of the cot in a line with the hinges 14 and is pivotally mounted by engaging the pivot bolt 19 through openings 26 formed in its ends 24 as clearly shown in Figure 7, the said truss member being in this manner adapted to be folded to position lying within the angles of the sides 5 of the section 2 as clearly shown in Figures 2 and 5 of the drawings. The truss member 22 is similarly mounted upon the pivot bolts 20 so that it may be folded to position lying with the angles of the sides 7 of the section 3 as shown in Figure 5. At this point it will be evident that the truss members 21 and 22 being of rigid structure, serve effectually to relatively brace the sides of the several sections of the bed frame with which they are associated, and because of the fact that they are suspended at the points of location of the hinge connections between the relatively adjacent sections of said frame, their presence renders the sides of the frame, considered as units, equally as rigid as though the said sides were of one piece throughout their entire lengths. This is of great advantage as in this manner the sides of the bed frame are restrained against springing toward each other when weight is imposed upon the bed frame.

The bed bottom comprises a web or fabric 27 of any suitable construction stretched and suspended between and by a number of helical springs 28 connected at intervals along the sides 5, 7 and 13 of the sections 2, 3 and 4. The fabric 27 is also supported by other springs 29 connected with the members 6 and 8 of the sections 2 and 3, but the preponderance of the weight imposed upon the bed bottom is sustained by the springs 28 and the sides of the bed frame. However the strain thus imposed upon the frame sides will not result in their distortion or inward springing toward each other because of the provision of the truss members 21 and 22.

Associated with the truss members 21 and 22 and the head and foot sections 2 and 3, are other truss members indicated by the numeral 30. These members are preferably two in number and each comprises a chain or cable more or less permanently connected at one end as at 31 to the cross member of one of the end sections of the bed frame as for example the member 8 of the foot section 3. From these points of connection which are preferably located near the ends of the member 8, the truss members 30 are led in the direction of the head end of the frame and beneath the cross bars 23 of the trusses 22 and 21, being connected or secured as at 32 to the said bars and being led beyond the truss member 21 and connected at their respective ends to tension bolts or screws 33 fitted through openings in the cross member 6 of the head section 2 and having nuts 34 threaded thereon and adapted to be adjusted for the purpose of taking up any slack in the flexible elements comprising the truss members 30.

It will now be understood that when the cot is set up, the members 30 will be stretched taut and by an equalized pull upon the truss members 21 and 22 will cause these latter members to assume an upright position beneath the bed frame. The truss members 30 being suspended from the cross members 6 and 8 of the head and foot sections of the bed frame serve effectually as a means for preventing downward displacement of the truss members 21 and 22 so that the truss structure as a whole will not only prevent lateral distortion of the sides of the bed frame but will also prevent any sagging of the said sides and therefore when the cot is set up, the frame will be as substantial and rigid as though all its parts were rigidly connected together or integrally formed throughout.

The head and foot frames of the cot are indicated respectively by the numerals 35 and 36 and each comprises a top or cross bar 37 and side members 38 which constitute legs for the bed frame when the cot is set up. The head and foot frames are swingingly connected with the head and foot sections 2 and 3 respectively in such a manner that they may be adjusted to assume the upright position shown in Figure 1 of the drawings or may be folded to lie within the bounds of the respective sections 2 and 3 as shown clearly in Figures 3, 5 and 6 of the drawings. In so mounting the frames 35 and 36, pairs of arms 39 and 40 are provided. The arms 39 are connected pivotally as at 41 to the sides 38 of the respective frames and at their opposite ends are pivotally connected as at 42 to the adjacent sides of the sections 2 or 3 as the case may be. The arms 39 are so arranged and connected that when the frames 35 and 36 are set up, the arms will be substantially horizontal, and at such time their upper edges will be received in notches 43 formed in the lower edges of the depending wings of the cross members 6 or 8 as clearly shown in Figure 1 of the drawings. Therefore the members 6 and 8 of the head and foot sections will rest and be supported upon the said arms 39, the points of engagement of the members 6 and 8 with the arms being intermediate the pivots 41 and 42.

The arms 40 are of greater length than the arms 39 and are pivotally connected at their upper ends as at 44 to the sides of the head or foot section of the bed frame and at their lower ends are pivotally connected as at 45 to the sides 38 of the respective section 35 or 36 as the case may be. It will now be evident that the head and foot frames may be swung about their connections with the respective sections of the bed frame so as to assume the upright position shown in Figure 1 in which position the bed frame will be firmly supported by the arms 39, and the head and foot frames will be firmly braced by the arms 40. Also the head and foot frames may be swung to assume the folded position shown in Figures 4, 5 and 6 of the drawings, and as the said frames are of slightly less width than the bed frame, the arms 39 and 40 will be received, in this latter position of the parts, side by side within the angles of the side members of the respective sections 2 and 3, as will also the said head and foot frames, this disposition of the parts being most clearly shown in Figure 6. In swinging the head and foot frames to folded position, the frames will be caused to automatically assume a parallel relation to the respective sections 2 and 3 by reason of the difference in length of the arms 39 and 40 and also due to the fact that the pivots 42 and 44 are located nearer each other than are the pivots 41 and 45.

As before stated the arms 39, in the set-up positions of the parts, engage in notches 43 formed in the cross members of the head and foot sections of the bed frame and by reason of this interengagement of the parts, the head and foot frames are effectually restrained against any transverse displacement with relation to the ends of the bed frame. Also the pivots for the arms 39 are to a great extent relieved of strains.

From the foregoing and by reference to Figures 2, 3, 4, 5 and 6 of the drawings it will be evident that a cot constructed in accordance with the invention may be folded to exceptionally compact form with the truss members 21 and 22 and head and foot frames 35 and 36 completely enclosed within the boundaries of the bed frame sections. In fact when completely folded the structure will have marginal dimensions equal to not more than the width of the bed frame and one-third the length of the bed frame as a whole, the thickness of the folded structure being not greater than the combined depth of the head and intermediate sections 2 and 4.

Having thus described the invention what is claimed as new is:

1. In a folding cot or the like, foldably connected end and intermediate sections, the said intermediate section and one of the end sections comprising angle iron side members and being foldable to position with the angles of their side members confronting each other, the other said end section being foldable to position with its side members lying within the bounds of said angles.

2. In a folding cot or the like, foldably connected end and intermediate sections, the said sections including side members, and the side members of the intermediate section and one of the end sections being of angle material, said sections being adjustable to position in alinement with the ends of their respective side members abutting and to folded position with the angles of their side members confronting each other, the other end section being foldable to position with its side members lying within the bounds of the said angles of the first mentioned sections.

3. In a folding cot or the like, foldably connected end and intermediate sections, the intermediate section including side members of angle formation, one of the end sections having side members pivotally connected with the respective side members of the intermediate section within the angle thereof, the other end section including side members pivotally connected with the respective side members of the intermediate section, the first mentioned end section being movable upon its pivots to position with its side members seating within the angles of the side members of the intermediate section, and the last mentioned end section being movable upon its pivots to position overlying the enclosed first mentioned end section.

4. In a folding cot or the like, foldably connected end and intermediate sections, the intermediate section including side members of angle formation, one of the end sections having side members pivotally connected with the respective side members of the intermediate section within the angle thereof, the other end section including side members pivotally connected with the respective side members of the intermediate section, the first mentioned end section being movable upon its pivots to position with its side members seating within the angles of the side members of the intermediate section, the last mentioned end section being movable upon its pivots to position overlying the enclosed first mentioned end section, and head and foot supporting means connected with the end sections and adjustable to position to lie within the bounds thereof when the said end sections are folded.

5. In a folding cot or the like, foldably connected end and intermediate sections comprising angle iron side members, and transverse truss members pivotally mounted on the connections between the end and intermediate sections and foldable to position within the angles of the side members of the respective end sections.

In testimony whereof I affix my signature.

REUBEN B. CREASY. [L.S.]